United States Patent [19]
Schoon

[11] 3,763,824
[45] Oct. 9, 1973

[54] SYSTEM FOR GROWING AQUATIC ORGANISMS

[75] Inventor: David J. Schoon, St. Paul, Minn.

[73] Assignee: Minnesota Mining and Manufacturing Company, St. Paul, Minn.

[22] Filed: Nov. 30, 1971

[21] Appl. No.: 203,257

[52] U.S. Cl. ............................. 119/4, 99/2, 119/2
[51] Int. Cl. ........................................ A01k 61/00
[58] Field of Search ...................... 119/1, 2, 3, 4; 99/3, 2

[56] References Cited
UNITED STATES PATENTS

| | | | |
|---|---|---|---|
| 3,477,406 | 11/1969 | Fujinaga | 119/2 |
| 3,658,034 | 4/1972 | Day et al. | 119/2 |
| 3,196,833 | 7/1965 | Glancy | 119/4 |
| 3,116,712 | 1/1964 | Ogden et al. | 119/2 X |
| 3,572,291 | 3/1971 | Cavanagh | 119/3 |
| 3,473,509 | 10/1969 | Miyamura | 119/2 |
| 3,573,934 | 4/1971 | Mitchell | 119/3 X |

Primary Examiner—Russell R. Kinsey
Assistant Examiner—James H. Czerwonky
Attorney—Alexander, Sell, Steldt & Delahunt

[57] ABSTRACT

A controlled, compatible, staged continuous-batch system for growing algae comprising a plurality of growing containers in series arranged in exponential progression such that each in the series is at least 30 percent larger than the preceding container. Conduit means between containers, a source of nutrient and, a source of water are provided. The system reduces the probability of extensive contamination, permits isolation of contamination, and is mathematically optimized to produce organisms at a minimal cost. Transfer of the algae occurs from one container to another when concentration of the algae in a first container reaches $10^6$ to $10^7$ cells/cm$^3$, after which transfer from successive containers takes place when that concentration level is serially reached.

4 Claims, 1 Drawing Figure

PATENTED OCT 9 1973 3,763,824
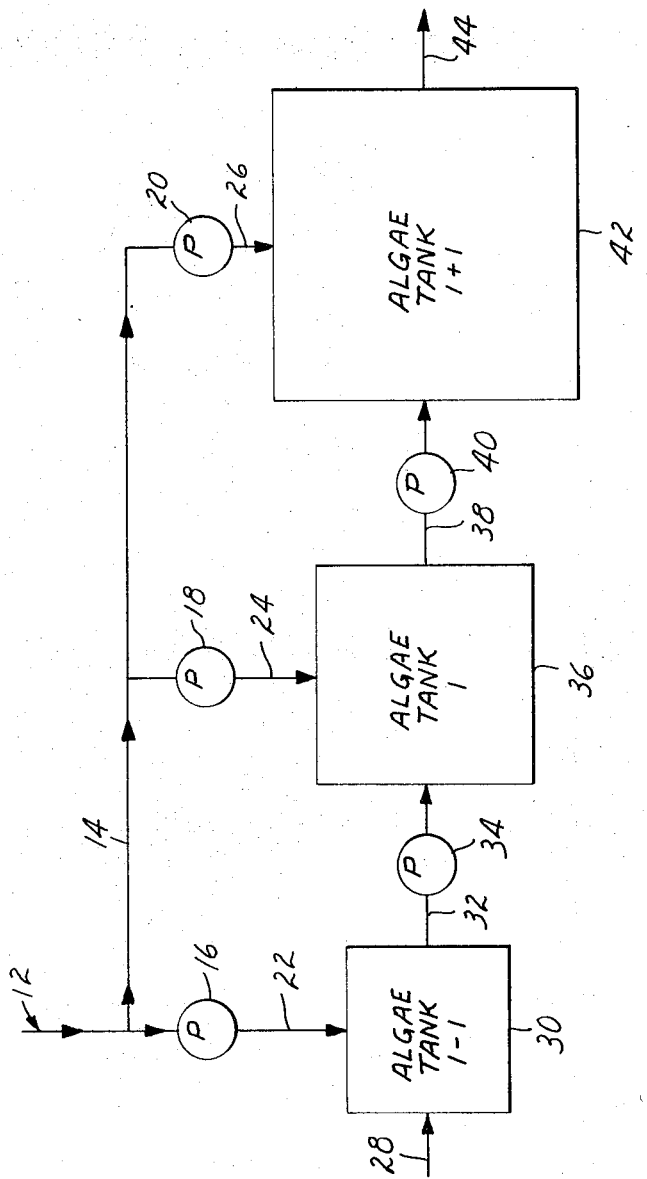
INVENTOR.
DAVID J. SCHOON
BY Kinney, Alexander,
Sell, Steldt & DeLaHunt
ATTORNEYS

SYSTEM FOR GROWING AQUATIC ORGANISMS

BACKGROUND OF THE INVENTION

According to the present invention, there is provided a controlled, compatible staged continuous-batch system for growing various organisms in an aquatic medium. The system is capable of being operated as a batch system or a staged-continuous system, thus reducing the possibility of contamination and if contamination occurs, allows convenient elimination of the contamination and provides an optimum growing environment.

One of the major areas of the world yet to be developed for the growing of food products for man lies in the earth's surface water which amounts to about seven-tenths of this planet's surface. This is considered to be the earth's last frontier and, thus, is a reason for the current interest by many industries in exploratory oceanographic missions.

Heretofore, food for man from the earth's water bodies has consisted of harvesting the natural foods. However, the social and industrial growth of man, with his lack of concern for the protection of water, has resulted in the devastation of many of the prime areas for the natural growth of aquatic derived foods. This has resulted in a shorter supply of marine derived foods and more costly harvesting of the marine foods in the more distant off shore productive areas. This situation has resulted in the current interest in aquaculture, the growing and harvesting of marine foods under controlled conditions.

Contingent upon the successful development of aquaculture for any marine derived food for man is the development of efficient growing of the food under controlled conditions. The method derived must be economical and as such cannot absorb large losses through contamination of the culture. Also, efficient use of nutrients and light must be realized.

Although many various aquatic organisms are grown according to certain prior art procedures according to the present invention, the growth and production of algae, as one particular organism, will be described in detail to illustrate the invention. For the example of growing algae for food in the growing of cultured oysters, the algae are grown either by a continuous or batch system. The continuous system uses one growing tank. Nutrient is added and algae removed at a constant rate. The algal cell density (cells per unit volume of culture) is constant in time, usually at the highest concentration obtainable for the dilution rate used. When contamination occurs, the entire algae culture may be lost. The continuous growing tank contents must be discarded or all of the organism immediately fed to the oysters. Then the tank must be cleared, sterilized, and reinoculated with the organism. The time required to regain steady-state operation may be considerable, on the order of several days to a week or more depending on the back-up facilities available.

In the batch system, the algae culture is grown in successively larger tanks. The contents of each tank, on reaching a desired algae concentration, is transferred to a larger tank together with additional sea water and nutrient. This process continues until sufficient algae is obtained to satisfy the feeding requirements of the oysters. Contamination, particularly in the latter stages of growth, is not as consequential as it is in the continuous system inasmuch as the time required for the contaminants to reach consequential proportions may exceed the time required for the algae to pass through the various sized tanks and reach feeding quantity and concentration. However, the cost of operating a batch system is somewhat higher than that of operating a continuous system (assumed free of contamination) because the total volume of the tanks is larger and hence more light energy is required. The constant cell density of the continuous system permits continual operation at the most efficient relationship between cell density and lighting provided. The efficient use of lamp energy is important because these energy costs are much greater than nutrient costs or any other cost in the algae system.

Thus, the continuous system overcomes many of the economic and operating problems of the batch system, the latter being less suitable for a large scale aquaculture system. However, the continuous system is more susceptible to contamination than is the batch system. Any contaminant which has a faster growth rate than the culture eventually overcomes the entire continuous flow tank. At this point, complete shut down is required for draining, cleaning, sterilizing, and restarting. Even without contamination, a shut down is needed to remove debris from stagnant areas and tank walls. These problems make this type of production system economically impractical on a large industrial scale.

If one uses staged-continuous reactors, i.e., the output of one reactor (tank) being pumped, with additional nutrient, into the next reactor, etc., the problem is reduced substantially but not entirely eliminated. Only the fastest growing contaminants can divide fast enough to remain in a staged reactor with its lower effective holding times (reciprocal dilution rate, the volume at a given tank divided by the combined flow rates of algae from the previous reactor, nutrient, and additional sea water), these holding times being the same in each reactor to minimize the potential for contaminants overtaking the algae.

However, draining and cleaning the tanks is still quite difficult using the staged-continuous system. Moreover, it would be necessary to occasionally restart the system to remove any fast-growing contaminants which might have become established, and to clean the tank of debris which may accumulate. Consequently, applicant is unaware of any convenient, economical process for optimumly growing and producing organisms in an aquatic medium, particularly a system which may be run automatically.

SUMMARY OF THE INVENTION

The system for growing organisms in an aquatic media according to the present invention is a compatible, batch and staged-continuous growing system. The system of the present invention can be operated either as a batch or staged-continuous system, and the design of each mode is optimized to minimize the cost of operation in either mode. The novel system designed for the batch staged-continuous unit includes the flexilbity of contamination control at maximum efficiency and lowest cost without serious interruption of the overall growth cycle of the organism. Also, economical and continuous organism growth production and automated control process to achieve this organism growth within particular optimum growth cycle conditions are provided.

The system of the present invention comprises, generally, an automatically controlled, compatible, staged-continuous batch system for growing and producing organisms in an aquatic media comprising a plurality of growing containers in series arranged in an exponential progression of container volumes, such that each container in the series is a fixed volume ratio larger than each preceding container, each container being at least 30 percent larger than the preceding container; conduit means connecting said growing containers, such that a fixed percentage of the total container volume may be transferred from smaller container to larger container a source of nutrient for the particular organism; and a source of water having chemical and physical properties suitable for the growth of said organisms; whereby, when the concentration of the organism in a first container reaches an optimum concentration, a portion of aquatic media containing said organism is transferred to the next larger container in the series wherein the organism concentration again reaches an optimum level, after which a fixed volume of organism-containing aquatic media is transferred to the next largest container and so forth until the last container in the series wherein the organism may be removed for its intended use.

Each tank in the system, as noted above, is a fixed volume ratio larger than the previous container, preferably, where certain algae are being grown, this factor is 1.649. During batchwise operation, the efficiency of the system is maximized such that the culture in each tank is available for use as inoculum to the following tank at a given precise time (i.e., at its highest count or density obtainable during exponential growth). Routine cleaning of the tanks between harvest and reinoculation is possible with this system, which also plays a big part in reducing contamination. Batchwise operation is used to isolate contamination and provide the opportunity to clean the tanks. Once the system is relatively free of contamination, it can be transformed to a stage-continuous operation to obtain somewhat larger (37.6 percent larger using the factor of 1.649 noted above) algae or organism output until accumulation of contamination or debris necessitates switching back to the batchwise mode of operation. Although the first few stages of this system must be kept pure, the largest tanks can be operated with less precautions being taken against contamination.

To illustrate how the system operates, particularly where optimum growth of algae is desired at low cost, certain generic formulae have been developed. These formulae are only illustrative and various other methods of using the system described herein are within the scope of the present invention.

A continuous culture system would be made up of a single tank of S cm.$^3$ wherein S is the size of the tanks. Nutrient and sea water mixture is added at a rate $S/\theta$ cm.$^3$ per day rate, and algae is removed at the same rate. The production of algae is $SC/\theta$ cells per day where C is the steady-state cell concentration, cells per cm.$^3$, and $\theta$ is the tank holding time in days. Success of the operation depends upon the algal cells being able to divide once every $\theta$ days at concentration C. Although maximum efficiency of operation is obtained, any contaminant which divides faster than one division every $\theta$ days will eventually take over the tank. If only a single tank of size S is available, restarting from a small inoculum of pure culture would be very difficult and time-consuming (a week or more being required for typical systems). For C. nana, an algae, with the proper nutrient, aeration, lighting, temperature control, and stirring; a concentration $C = 1.0 \times 10^7$ cells per cm.$^3$ would be obtained at a holding time of $\theta = 1.0$ day. The system might run, without severe contamination reducing the algae density, for a period of 5 days to a month. However, eventually the system will have to be shut down for cleaning, and reinoculation. Severe contamination undesirably reduces the algal cell density to less than $1 \times 10^6$ cells per ml. At a shorter holding time, slightly increased contamination resistance is obtained; however, the resultant decrease in cell density C results in an increase in production costs.

A batch culture system is made up of many tanks, these being of size $S_1, S_2, S_3 \ldots, S_N$ cm.$^3$ Each tank is equipped to provide adequate and proper aeration, lighting, stirring, and temperature control. With the exception of the first tank, the procedure for growing algae is as follows: When the culture density reaches a prescribed level (e.g., $1.0 \times 10^7$ cells per cm.$^3$) the contents of that tank are dumped into the next larger tank, the same being initially empty. Additional nutrient and sea water is added to fill the tank and dilute the culture. When the culture density has again increased to a prescribed level, this procedure is repeated. The first tank in the system is sufficiently large that only a portion of its contents need be transferred to the second tank, the remainder acting as an inoculum for future growth. The first tank is operated in duplicate or triplicate so that if contamination should occur, back-up cultures are available.

The tank sizes compatible with such an arrangement can be calculated as follows: If the culture follows exponential growth characteristics, then $$C_i(t) = C_i(0)\, e^{\mu t}$$

where $C_i(t)$ is the culture density (cells per cm.$^3$) in tank No.1 at time $t$; $\mu$ is the growth rate of the algae (divisions per day). $C_i(0)$ is the culture density at time where $t = 0$. It rapidly follows that if the growth time in each tank is $T$, then the tank sizes should be related according to $$S_i/S_{i-1} = e^{\mu t}.$$

If the time rquired for drainage, cleaning and reinoculating each tank is $T_D$, then the size of the last tank is $$S_N = J(T + T_D)/C_{max}$$

where $J$ is the required output flux of the algae production system, cells per day, and $C_{max}$ is the cellular concentration at which each tank is harvested. From the above two relations the entire batch system can be designed. The size of tank $N$ minus $I$ (wherein $N$ is the total number of tanks in the system and $I$ is any arbitrary number between 0 and N-2; and N minus I equals K) will be $$S_{N-I} = J(T + T_D)/C_{max} e^{I \mu t}$$

Excellent resistance to contamination is obtained in this system. If tank No. K should become contaminated, it is highly unlikely if not impossible that tanks K minus 1 or K plus 1 could be contaminated from tank K. When a transfer occurs, tank K plus 1 will contain the contamination; after another transfer tank K plus 2 will be contaminated. However, the preceding and following tanks in the system should remain pure unless contaminated from some other source. Eventually the contaminated culture will be fed to the oysters and, in effect, the contamination will be "washed out" of the system. In addition, if there are N tanks in the system, the contamination will have, at most NT days to grow before it, along with the algae, will be fed to the oysters. In most instances, this time will be insufficient for the contamination to reach detrimental concentrations.

The disadvantage of this system is that the total volume of the system is somehwat larger than that of the continuous or the staged continuous system discussed hereinafter below, and the growing space is quite expensive to aerate and illuminate.

The staged continuous system provides still another mode of growth. Tanks are arranged as in the batch system (though the sizes are not always calculated as above, in some cases the tank sizes may all be the same). However, output from each tank is continually pumped into the next tank. In addition, nutrient and sea water is added continually to each tank. Maximum resistance to contamination is obtained if the effective holding time in each tank is as low as possible; this in turn is obtained if all holding times are identical. This condition is obtained if $$S_i/S_{i-1} = 1 - \theta\mu$$

wherein $S$ and $\mu$ have the same definition as before and $\theta$ is the staged holding time (tank volume divided by flow rate of all inputs: nutrient, sea water, and algae from preceding tank). Nutrient and sea water are added to each tank at the rate $\mu S_i$ cm.$^3$ per day.

The advantage of the staged continuous sytem is that the total volume of all the tanks is the same as that of the continuous system, both operating at the maximum theoretical efficiency. Additional contamination protection is obtained over that of the continuous system in that the staged holding time is far shorter than the continuous holding time (assuming $S_i = S_{i-1}$). However, the contamination resistance of the batch system is still not obtained.

According to the present invention a compatible batch staged-continuous system operated according to the following formula:

$$S_i/S_{i-1} = e^{\mu T} = 1/(1-\mu\theta)$$

where $\theta$ is the staged holding times, and may be defined as $(1-e^{-\mu T})$ divided by $\mu$, all definitions being the same as heretofore defined. Not only can the system be operated in all modes, but its operation can be conveniently switched from one mode to the other to take advantage of operation in the alternate mode. The production of the system in the staged continuous mode will be higher than that in the batch mode, which would result in a desirable increased oyster growth.

As one embodiment of the invention, an algae production facility in which minimum output should be 1.0 × 10$^{17}$ cells per day is exemplified. This can be done by selecting tank sizes such that this output is obtained during batch operation, the less efficient of the two modes. For a division rate of 1.0 division per day, a growth time of 12 hours, and a drainage, cleaning, reinoculation time of 1.0 hour, the following tank sizes, each but Nos. 1 and 2 being larger than the previous by a factor of 1.6487, are obtained:

| Tank No. | Size, gallons | Tank No. | Size, gallons |
|---|---|---|---|
| 1 | 257 | 11 | 15,897 |
| 2 | 177 | 12 | 26,211 |
| 3 | 291 | 13 | 43,215 |
| 4 | 480 | 14 | 71,250 |
| 5 | 792 | 15 | 117,471 |
| 6 | 1,305 | 16 | 193,677 |
| 7 | 2,152 | 17 | 319,318 |
| 8 | 3,547 | 18 | 526,468 |
| 9 | 5,848 | 19 | 867,998 |
| 10 | 9,643 | 20 | 1,431,087 |

The total volume of all tanks is 3,637,101 gallons. Tank No. 1 is made as large as it is so that 107 gallons of culture can be removed for inoculum in tank 2 every 13 hours with sufficient remaining to bring the culture density up to the harvested level, 1.0 × 10$^7$ cells per cm.$^3$, by the time another 107 gallons is required. Although up to seven-place accuracy is shown on tank sizes, the tanks need not be built to this accuracy. The sizes shown are minimum sizes any tank volume in excess of these sizes will be wasted space and will generate slightly higher operating costs; in no case can any tanks be built as large or larger than the following tank in the flow system.

Each of the tanks is adjacent to the preceding and following tanks in the list. Each is equipped with suitable process equipment to maintain nutrient input and algae output, to alternate the flow and holding pattern for concentration control, as well as to regulate the light energy input. Pumps are to be provided to pump algae from tank 1 to tank 2, from tank 2 to tank 3, etc., from 18 to 19, and from 19 to 20. An outlet is provided for distributing the contents of tank 20 to the oysters, either batchwise in less than an hour or continually at a lower flow rate. The tank-to-tank transfer pumps should be capable of pumping out the contents of the supply tank in one hour or less, or alternately operating with reduced flow (by intermittently operating the pump or by providing a bypass valve) to pump out a volume equal to that of the preceding tank at a rate of one tank volume in about 9.44 hours (i.e., each tank has a holding time while operating staged continuous of 9.44 hours). In any case the pumping flow rates must be adjustable to provide flexibility for changing operational modes. The same is true for the pumps which add nutrient and sea water to each tank. These flow rates should be adjustable so that the required nutrient and sea water mixture can be added to a given tank in one hour, in batch mode, or continually to produce the desired holding times.

According to the present invention, changing between the batch and staged-continuous operation may be accomplished by changing pump programming. Such a change would preferably be a programming change. The tank sizes are compatible for either system, a 37 percent higher output of algae being realized when operating staged continuous. When and if contamination enters the system, operation is switched to batch by alternating the programming on the pumps as described above. In addition, batchwise operation may be desirable once a week or thereabouts for cleaning purposes, thereafter staged continuous operation is resumed. Tank 1 may be operated in duplicate or triplicate to assure an absolutely pure inoculum for subsequent tanks.

The invention will be better understood with reference to the drawing.

BRIEF DESCRIPTION OF THE DRAWING

The drawing is a schematic diagram of the system of the present invention.

DETAILED DESCRIPTION OF INVENTION

As illustrated therein, a series of tanks are sequentially set such that each tank in the series is larger than the preceding tank by a factor of 1.649 when using algae as an example. Only three tanks are illustrated in the drawing for purposes of illustration. Although, in most cases many more tanks would be used, particularly where large scale production is desired. Nutrient and sea water are supplied to the system through conduits 12 and 14 and thereafter pumped into the various tanks by means of pumps 16, 18 and 20 through conduits 22, 24 and 26. As the algae in the tank preceding tank 30 (not shown) reach an optimum concentration, a portion of the contents of the preceding tank is transferred into tank 30 through conduit 28. Similarly, when the algae concentration is optimal in tank 30, a portion thereof is transferred to tank 36 by pump 34 through conduit 32. Thereafter, a portion of the contents of tank 36 is transferred to tank 42 by means of pump 40 through conduit 38 and, again, is transferred from tank 42 to another tank (not shown) or fed, by means of conduit 44.

If desired, all the pumps in the system can be operated through automated control means such as computer programming. Temperature control is accomplished by varying the temperature of the incoming nutrient and sea water mixture, although other methods of temperature control could also be used, such as heating elements in the various tanks. Each tank is equipped with fluorescent or other lighting, aeration, and stirring means as required for growing the particular organism.

The algae, *C. nana*, commonly used as nutrient for oyster growth can be conveniently grown in an open tank for a period of 30 division times (one cell produces over 1 million cells in this time) without adverse mutation or accumulation of toxic by-products which inhibit growth. Moreover, it is believed that this process can be continued indefinitely in the absence of contaminants. *C. nana* will maintain a concentration of $1.0 \times 10^7$ cells per cm.$^3$ at a holding time of 24 hours in a continuous chemostat (i.e., each cell divides once every 4 hours) or in a staged continuous system as described above at a staged holding time of 9.44 hours as the cells still need divide only once in 24 hours. An absorbed light energy of about 200 lumens per gallon from cool white fluorescent lamps is adequate. Ideally, the temperature should be about 23° C. for optimum growth, although adequate growth is obtained in the range from about 18° to 25° C. Aeration of 1.0 cubic feet per hour per gallon of culture is preferred.

Various aquatic media can be used for growing organisms according to the invention. One preferred media which is quite satisfactory for the production of certain algae (*C. nana*) comprises the following:

| | |
|---|---|
| $Na_2SiO_3 \cdot 5H_2O$ | $6.00 \times 10^{-2}$ gram/liter |
| $NaNO_3$ | $7.50 \times 10^{-2}$ gram/liter |
| $NaH_2 \cdot 5H_2O$ | $1.80 \times 10^{-2}$ gram/liter |
| Na-Fe Sequestrine (iron sequestering agent) | $9.00 \times 10^{-3}$ gram/liter |
| $MnCl_2 \cdot 4H_2O$ | $1.08 \times 10^{-4}$ gram/liter |
| $ZnSO_4 \cdot 7H_2O$ | $1.32 \times 10^{-5}$ gram/liter |
| $CoCl_2 \cdot 6H_2O$ | $6.00 \times 10^{-6}$ gram/liter |
| $CuSO_4 \cdot 5H_2O$ | $5.88 \times 10^{-6}$ gram/liter |
| $Na_2MoO_4 \cdot 2H_2O$ | $3.78 \times 10^{-6}$ gram/liter |
| Thiamin·HCl | $6.00 \times 10^{-5}$ gram/liter |
| Biotin | $3.00 \times 10^{-7}$ gram/liter |
| Vitamin $B_{12}$ | $3.00 \times 10^{-7}$ gram/liter |

This media is prepared in filtered and ultraviolet sterilized sea water.

Additional optimization of nutrient composition, nutrient concentration, aeration with addition of $CO_2$, light intensity, light placement, light cycling, temperature, and stirring can increase the cell density to more than the desired $1.0 \times 10^7$ cells per ml. for optimum algae production.

EXAMPLE I

The range in tank size ratios can be seem from the following additional examples. For all of the following, the tank cleaning time is assumed to be one-half hour, the required output flux is $1 \times 10^{15}$ cells per day, the available input flux is $1 \times 10^{10}$ cells per day, and the cell concentration at the specified division rate is $1 \times 10^7$ cells per ml. If there are various organisms of varying division time and if one wants, in one case 50 percent and in the second case 75 percent of the staged continuous production level to be achieved during batchwise operation, the system would be built in the following way:

A. 50 percent production during batchwise operation

| Division Time hr. | Ratio, Tank Sizes | No. of Tanks required | T* hr. | θ** hr. | Volume of Largest Tank |
|---|---|---|---|---|---|
| 60 | 4.85 | 8 | 94.77 | 47.64 | 198.481 L. |
| 30 | 4.78 | 8 | 46.96 | 23.73 | 98.870 L. |
| 24 | 4.75 | 8 | 37.39 | 18.95 | 78.946 L. |
| 20 | 4.72 | 8 | 31.02 | 15.76 | 65.661 L. |
| 15 | 4.65 | 8 | 23.04 | 11.77 | 49.051 L. |
| 10 | 4.51 | 8 | 15.06 | 7.78 | 32.431 L. |
| 8 | 4.41 | 8 | 11.87 | 4.41 | 25.776 L. |
| 4 | 3.91 | 9 | 5.45 | 2.98 | 12.403 L. |

B. 75 percent production required during batchwise operation.

| Division Time hr. | Ratio, Tank Sizes | No. of Tanks required | T* hr. | θ** hr. | Volume of Largest Tank |
|---|---|---|---|---|---|
| 60 | 1.78 | 22 | 34.43 | 26.20 | 109,169 L. |
| 30 | 1.71 | 23 | 16.15 | 12.49 | 52.047 L. |
| 24 | 1.68 | 24 | 12.46 | 9.71 | 40.491 L. |
| 20 | 1.65 | 25 | 9.96 | 7.84 | 32.690 L. |
| 15 | 1.56 | 27 | 6.73 | 5.42 | 22.602 L. |

For microorganisms having a division time of 24 hours but a variable percentage of staged continuous output flux being required during batchwise operation, the following designs are obtained:

| Required Percentage | Ratio, Tank Sizes | No. of Tanks required | T* hr. | θ** hr. | Volume of Largest Tank |
|---|---|---|---|---|---|
| 30 | 23.87 | 5 | 76.15 | 23.00 | 98.812 L. |
| 40 | 9.05 | 7 | 52.87 | 21.35 | 88.952 L. |
| 50 | 4.75 | 9 | 37.39 | 18.95 | 78.946 L. |
| 55 | 3.68 | 10 | 31.29 | 17.48 | 72.845 L. |
| 60 | 2.94 | 12 | 25.91 | 15.85 | 66.028 L. |
| 65 | 2.41 | 15 | 21.08 | 14.03 | 58.464 L. |
| 70 | 2.00 | 18 | 16.66 | 12.01 | 50.053 L. |
| 75 | 1.68 | 24 | 12.45 | 9.72 | 40.492 L. |
| 80 | 1.39 | 36 | 8.03 | 6.83 | 28.463 L. |

From these tables it can be seen that the ratio in tank sizes might vary for typical designs from 1.39 to 23.

*T is the batchwise growth time, after which the contents of any given tank are transferred to the next tank in the series.

**θ is the staged holding time and equals tank volume divided by the combined input rate from previous tank and additional nutrients. Organisms which might invade a given tank as contaminants having a division time longer than θ cannot remain indefinitely in that tank, but will be washed out into subsequent tanks.

EXAMPLE II

This example illustrates a system according to the present invention where a certain amount of production of a specific organism is desired. For example, where it might be desired to produce $1 \times 10^{15}$ cells per day (output flux), during staged continuous operation of *M. lutheri* algae, which is known to divide once every 60 hours at a maximum concentration of $3 \times 10^6$ cells per ml., the system must be set up according to certain specifications. The input flux of algae will be $1 \times 10^{10}$ cells per day. It is required here, for optimum production, that a batchwise operation results in no more than a 50 percent reduction in production rate. Cleaning of the tanks during batchwise operation requires about 2 hours per tank.

The necessary tank sizes can be determined by using the principles given above. For staged operation, the size of the last tank is given by $$S_N = J\theta/C_{max} = J(1 - e^{-\mu T})/\mu C_{max}$$

wherein $J$ is the output flux and all of the other letters are defined as before. Using $0.5 J$ (50 percent $J$) as the required output flux for batchwise operation, the result is $$S_N = 0.5 J(T + T_D)/C_{max} .$$

Knowing that $\mu$ equals one-sixtieth hours$^{-1}$, $C_{max}$ equals $3 \times 10^6$ cells per ml., $J$ equals $(1 \times 10^{15})$ divided by 24 cells per hour, and $T_D$ equals 2 hours, the simultaneous solving of the equation results in: $T$ equals 92.179 hours; $\theta$ equals $1 - e^{-\mu T}/\mu$ equals 47.090 hours; and the ratio of tank sizes is $e^T$ equals 4.647.

The volume size of the tanks would be:

| Tank 8 | 654,024 liters |
| 7 | 140,726 liters |
| 6 | 30,280 liters |
| 5 | 6,515 liters |
| 4 | 1,401 liters |
| 3 | 301 liters |
| 2 | 65 liters |
| 1 | 14 liters |

The total system volume is thus 833,327 liters and the required input flux is $4.59 \times 10^9$ cells per day. Pumps would be provided as indicated hereinbefore to allow operation in either the batchwise or staged continuous mode. It is readily seen that such a system would be more effeicient and offer better contamination protection than one in which the tank sizes were chosen arbitrarily or if the possibility of switching between modes of operation were not made available.

EXAMPLE III

A final example supposes that the production of 1 million liters per day of yeast *S. cerevisiae* is desired, in a media which allows the yeast to divide once every hour at a concentration of $1 \times 10^9$ cells per ml. The initial inoculation of the yeast from a continuous reactor (e.g., the input flux) is 100 liters per day at the same concentration ($1 \times 10^9$ cells per ml.). The tank cleaning requires 10 minutes per tank. Using the same procedures described in Example II, the system would have the following design: $T$ equals 0.563 hours; $\theta$ equals 0.430 hours; ratio of tank sizes equals 1.756; largest tank equals 17,936 liters; smallest (17) tank equals 2.2 liters; total system volume equals 41,664 liters; input flux required equals 70 liters per day at $1 \times 10^9$ cells per ml., and batchwise production equals 59 percent of staged continuous.

It should be noted that solution of these equations is not necessarily required in order to obtain a workable system of this type. Various exponential series of tank sizes might be built, plumbed to operate both batchwise and staged continuous, and operated to determine feasibility for various designs. Nevertheless, the principles of (1) using a regular exponential series of tank volumes nd (2) compatible plumbing to permit batch or staged continuous operation must be applied to make a system of this type.

What is claimed is:

1. A controlled, compatible, staged continuous-batch system for growing and producing algae in an aquatic media, comprising:
   a plurality of growing containers in series arranged in a exponential progression of container volumes, such that each container in the series is a fixed volume ratio larger than each preceding container, each container being at least 30 percent larger than the preceding container;
   conduit means connecting said growing containers, such that a fixed percentage of the total container volume may be transferred from smaller container to larger container in the series;
   means to transfer said aquatic media from container to container through said conduit means;
   a source of nutrient for the algae; and
   a source of water having chemical and physical properties suitable for the growth of said algae;
   whereby, when the concentration of the algae in a first container reaches $10^6$ to $10^7$ cells/cm$^3$ a portion of aquatic media containing said algae is transferred to the next larger container in the series wherein the algae concentration again reaches said level, after which a fixed volume of algae-containing aquatic media is transferred to the next largest container and so forth until the last container in the series wherein the algae may be removed for its intended use.

2. The system of claim 1 wherein said algae is *C. nana*.

3. A method for growing *C. nana* algae in an aquatic medium to maturity and to a concentration suitable for feeding oysters, comprising continuously transferring said auqatic medium containing said algae at a concentration of $10^6$ to $10^7$ cells/cm.$^3$ from a growing container to a next larger growing container of a series of containers arranged in an exponential volume progression with each container being at least 30 percent larger than the preceding container, and diluting said medium by addition thereto of further aquatic medium and nutrient while illuminating at about 200 lumens per gallon, maintaining the temperature within the range of 18° to 25° and aerating the medium at a rate of approximately 1 cubic foot of air per hour per gallon of medium; and removing said medium and algae at said concentration from the final one of said growing containers to an oyster feeding area.

4. Method of claim 3 wherein said nutrient comprises components as obtained by mixing, in the proportions indicated, the following materials:

| | |
|---|---|
| Na$_2$SiO$_3$·5H$_2$O | $6.00 \times 10^{-2}$ gram/liter |
| NaNO$_3$ | $7.50 \times 10^{-2}$ gram/liter |
| NaH$_2$PO$_4$·5H$_2$O | $1.80 \times 10^{-2}$ gram/liter |
| Na-Fe Sequestrin (iron sequestering agent) | $9.00 \times 10^{-3}$ gram/liter |
| MnCl$_2$·4H$_2$O | $1.08 \times 10^{-4}$ gram/liter |
| ZnSO$_4$·7H$_2$O | $1.32 \times 10^{-5}$ gram/liter |
| CoCl$_2$·6H$_2$ | $6.00 \times 10^{-6}$ gram/liter |

* * * * *

UNITED STATES PATENT OFFICE
CERTIFICATE OF CORRECTION

Patent No. 3,763,824  Dated October 9, 1973

Inventor(s) David J. Schoon

It is certified that error appears in the above-identified patent and that said Letters Patent are hereby corrected as shown below:

Column 1, line 54 -- "cleared" should be "cleaned".

Column 2, line 58 -- "flexilbity" should be "flexibility".

Column 4, line 44 -- "rquired" should be "required".

Column 5, line 8 -- "somehwat" should be "somewhat".

Column 7, third line in the table on the bottom of the page -- "$NaH_2 \cdot 5H_2O$" should be "$NaH_2PO_4 \cdot 5H_2O$".

Column 7, seventh line in the table on bottom of the page -- "6.00 x0 $10^{-6}$ gram/liter" should be "6.00 x $10^{-6}$ gram/liter."

Column 8, first line in second column of second table -- "1.78" should be "1.788".

Column 9, line 28, "$1 - e^{-\mu T\mu /}$" should read -- $1 - e^{-\mu T}$ -- .

Column 9, line 43 -- "effeicient" should be "efficient".

Column 10, line 5 -- "nd" should be "and".

Column 10, line 42 -- "auqatic" should be "aquatic".

Column 9, line 29, "$e^T$" should read -- $e^{\mu T\mu}$ -- .

UNITED STATES PATENT OFFICE
CERTIFICATE OF CORRECTION

Patent No. 3,763,824  Dated October 9, 1973

Inventor(s) David J. Schoon      PAGE 2

It is certified that error appears in the above-identified patent and that said Letters Patent are hereby corrected as shown below:

Column 10, fourth line in the table, first column -- "Sequestrin" should be "Sequestrine".

Column 10, last line in the first column of the table -- "$CoCl_2 \cdot 6H_2$" should be "$CoCl_2 \cdot 6H_2O$".

Column 10, omitted from the bottom of the table:

| | |
|---|---|
| "$CuSO_4 \cdot 5H_2O$ | $5.88 \times 10^{-6}$ gram/liter |
| $Na_2MoO_4 \cdot 2H_2O$ | $3.78 \times 10^{-6}$ gram/liter |
| Thiamin$\cdot$HCl | $6.00 \times 10^{-5}$ gram/liter |
| Biotin | $3.00 \times 10^{-7}$ gram/liter |
| Vitamin $B_{12}$ | $3.00 \times 10^{-7}$ gram/liter" |

Signed and sealed this 13th day of August 1974.

(SEAL)
Attest:

McCOY M. GIBSON, JR.  
Attesting Officer

C. MARSHALL DANN  
Commissioner of Patents